July 29, 1969 F. R. ABBOTT 3,458,856
ELECTROACOUSTIC LUMPED CONSTANT TRANSMISSION LINE
Filed July 20, 1967
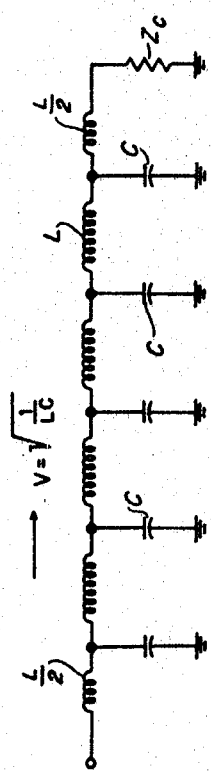
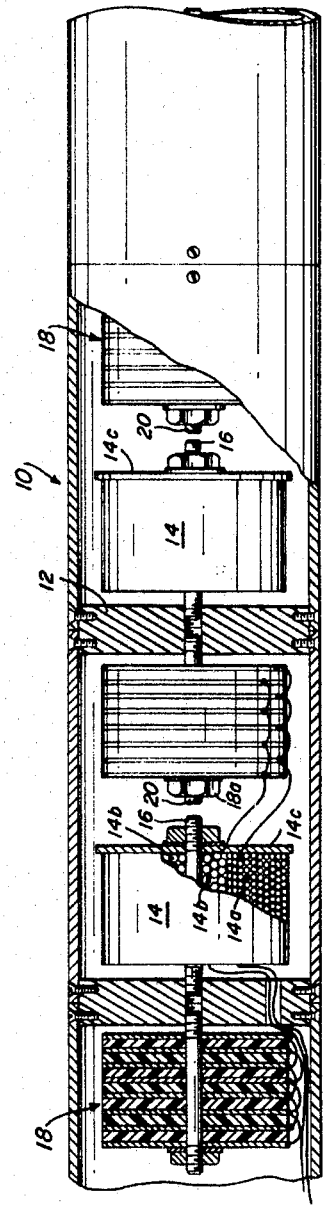
INVENTOR.
FRANK R. ABBOTT
BY
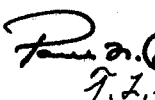
ATTORNEYS

United States Patent Office 3,458,856
Patented July 29, 1969

3,458,856
ELECTROACOUSTIC LUMPED CONSTANT TRANSMISSION LINE
Frank R. Abbott, San Diego, Calif., assignor to the United States of America as represented by the Secretary of the Navy
Filed July 20, 1967, Ser. No. 655,723
Int. Cl. H04b 13/00
U.S. Cl. 340—9          6 Claims

ABSTRACT OF THE DISCLOSURE

An elongated straight tube contains alternate capacitive and inductive transducers. The electrical constants are so selected as to cause the string of transducers to function like a lumped constant transmission line. By proper selection of the L and C of the line, the velocity of the electrical wave in the transmission line and the velocity of the resulting compressional wave lengthwise in the tube can be made to approach that of the velocity of sound waves in water. The result is an ideal end-fired beam forming device.

The invention described herein may be manufactured and used by or for the Government of the United States of America for governmental purposes without the payment of any royalties thereon or therefor.

Background

It is old as in Junger 3,142,034, to start a compressional wave lengthwise along a rod or tube and by properly loading the tube to reduce the velocity of the wave to near that of the velocity of sound in water so as to create the narrow beam of an end-fired array of transducers in water. However, much is left to be desired in controlling the velocity of the compressional wave, various loading techniques usually resulting in undesirably flectural or shear modes of vibration and large side lobes.

The object of this invention is to more effectively control the velocity of propagation of the compressional wave along a tube.

The object of this invention is attained by placing alternate transducers of different reactive types along the interior of the tube. The two types comprise, respectively, the transducer which is essentially capacitive in reactance while the other transducer is essentially inductive. The L's and C's of transducers are quite large and are so selected as to produce a lumped impedance transmission line the velocity of the electrical wave being that of the desired velocity of the compressional acoustical waves in the tube and in water.

Other objects and features of this invention will become apparent to those skilled in the art by referring to the specific embodiment described in the following specification and shown in the accompanying drawing in which FIG. 1 shows diagramatically a circuit of the electrical connections of the transducers of the system of this invention, and FIG. 2 is a partial sectional view of the transducer array of this invention.

Exteriorly, the array of this invention looks like a smooth elongated tube. Such a tube could be mounted in the slip-stream on the underside of a fast-moving ship without producing turbulence and the usual local noise. For convenience of assembly, the long tube may comprise short end-to-end sections of tubes. Interiorly, the tube contains transverse headers or discs 12 joined peripherally to the tube. The mass of the headers and attached transducers are quite high and the walls of the tube are thin for increased elasticity to yield a compressional wave velocity in the tube which is near that of sound in water. Conveniently, each header spans one joint between adjacent tube sections and is joined as shown to each section by flat-head threaded screws.

To one side of each header is attached transducer 14 mounted upon core member 16 which in turn is rigidly attached, as by threading, to the header 12. On the opposite side of the header is mounted the transducer 18, supported on core 20 which likewise is rigidly affixed to the header 12. In operation, a signal applied to the transducers imparts longitudinal motion to cores 16 and 20 which, in the preferred mode, drives the header 12 to the right or left in FIG. 2, and longitudinally compresses the wall of the tube 10 at the signal frequency.

Transducer 14 is of the electromagnetic type comprising winding 14a for an alternating current signal, and a bias winding 14b for magnetizing the core 16. Alternatively, permanently magnetized cores could be employed to obviate the necessity for the bias winding. To enhance motion in the core, the core material 16 may be selected for its magnetostrictive, property, that is, for its ability to distort in a magnetic field. In operation, a pulse on the AC winding 14a will momentarily compress the core and start a compressional wave along the core 16 and impart to the attached header 12 and tube 16 the compressional wave.

The other transducer, 18, is of a type the impedance of which is essentially capacitive. The transducer, preferably, comprises several thin discs of piezoelectric ceramic material such as polarized barium titanate. Both faces of each disc is covered with a god conducting metal foil or coating such as silver and the several discs are stacked on the core 20, and compressed under nut 18a. Alternate electrode coatings are connected together and to one terminal of the transducer, the remaining coatings being connected together and to the other terminal of the transducer. When a pulse of the proper polarity is applied to the terminals of the transducer the discs in unison expand lengthwise of the core and impart to the core a lengthwise motion which is transmitted in turn to the header 12 and hence to the cylinder 10.

Preferably, the windings 14a of each inductive transducer is connected in series while the capacitive elements of the transducers 18 are connected between ground and the junctions of the adjacent coils as shown in FIG. 1. If tube 10 is of metal, the tube may serve as ground.

As shown in FIG. 1, the series inductances L and the shunt capacitances C constitute a transmission delay line of the lumped impedance type. According to an important feature of this invention, the values of the capacity C and the inductance L are so chosen as to provide a velocity of propagation of the electric wave in the line equal to the velocity of sound in water.

The mechanical properties in turn of the tube 10 and the weight within the tube are so chosen that the velocity of propagation of a compressional wave along the tube is also about equal to the velocity of sound in water.

It is shown in applicant's copending application, Ser. No. 612,294, filed Jan. 25, 1967, longitudinal sound velocity, V, in a metal rod or hollow tube is equal to the square root of the longitudinal modulus of elasticity, E, divided by the density P of the material. That is, $$V = \sqrt{E/P}$$

If the density is expressed in terms of mass, M, per unit length, L, per unit cross-sectional area, A, of the rod or tube then $$V = \sqrt{\frac{EA}{M/L}}$$

It will appear, now, that if cross sectional area, A, is reduced as by thinning the wall of the tube, and if at the same time the mass M of the tube is increased, the velocity V of propagation of a compressional wave can be reduced as desired. The velocity desired for tube 10, here, is the same as the velocity of sound in water which is about 1500 meters per second.

Several pairs of transducers per meter may be employed. Summing the inductance L per meter and the capacity C per meter, the electrical wave velocity along the transmission line is given by $$\sqrt{1/LC}$$

With the assembly shown using barium titanate, the capacitance per module could be about 0.1 microfarad leading to about 1.0 farad per linear meter of the rod. The corresponding inductance should be about 0.045 henry per module or 0.45 henry per meter to achieve the desired velocity of 1500 meters per second. This inductance requires about 400 turns on the core as shown. The magnetic bias should be about three kilogauss requiring a bias current of about 40 milliamperes through 400 turns of number 24 wire with about 2.5 ohms DC resistance. The power dissipation of .02 watt per module would be minimal. The characteristic electrical impedance, Z, of such a lumped line becomes $$\sqrt{L/C}$$

or $$Z = \sqrt{.45/10^{-6}} = 660 \text{ ohms}$$

Hence, for most purposes the line would be terminated with a 660 ohm electrical resistor to avoid reflection of the electrical wave.

The rod or tube of Junger, supra, with a single transducer at one end serves as an end fired element but produces an unpredictable pattern with many side lobes. The device of this disclosure, however, allows free choice of form of radiation pattern from sharp end fired beam to broad side to opposite end fire. Flexibility of operation is enhanced by bringing out the leads for each transducer to one end of the tube where they can be interconnected as desired. It is significant, here that the beam pattern is stable, is operable throughout a broad band of frequencies, can be operated in the compressional mode and is not subject to erratic flectural and/or shear modes as in the single transducer device.

The transmission line of this invention can utilize electrical loads so distributed as to damp out anomalous or non-compressional waves along the tube wall.

The mechanical structural requirements to achieve 1500 meters per second compressional wave velocity are reasonably stringent. The average mass per unit length largely provided by the ceramic elements, the electromagnetic inductors, and the metal headers 12 can reasonably be nearly half that of a solid steel rod of the same diameter. This requires a cylinder 10 having a wall thickness such that the cross-sectional area of the wall is about ⅕₅ of the rod cross section to sustain the longitudinal compressional stress of the acoustic wave. This would be achieved by a three inch diameter tube with ⅓₃ inch wall thickness.

In manufacture, the ceramic and inductive transducers are assembled on their cores and fastened to the headers 12. Conveniently, coil 14 can be held under a threaded nut and an oversized iron washer 14c with an outside diameter but slightly less than the inside diameter of the tube to minimize the air gap in the magnetic circuit of transducer 14. An oversize nut and/or washer 18a on core 20 adds mass to one end of that core and serves as a tail piece for transducer 18. As each section of the cylinder 10 is slipped into place the wires are fed through the holes in the headers and the screws are attached to integrate the end-to-end sections of the cylinder. The entire assembly should be potted with a resin for protection in salt water. The sound velocity of resin is near that of water.

What is claimed is:

1. A unitary linear transducer array for beam forming comprising,
    an elongated tube of predetermined elasticity,
    a first group of transducers which are predominantly inductive in impedance,
    a second group of transducers which are predominantly capacitive in impedance,
    transducers of the first and second groups alternating along the interior of said tube and the movable element of each being mechanically coupled to the shell of the tube, and
    the inductances of said first group of transducers being connected in series, and the capacitances of said group of transducers being coupled in shunt between spaced points along the series inductances and a common ground to produce a lumped impedance transmission line, the impedance values being so selected as to produce a velocity of propagation of an electric wave of the order of the velocity of sound in water.

2. The array defined in claim 1 further comprising,
    a resistor connected in shunt between one end of the series of inductances and said ground, the magnitude of said resistor being substantially equal to the characteristic impedance of said transmission line to minimize reflections.

3. In the array defined in claim 1,
    the transducers of said first group of transducers each comprising an electromagnetic coil,
    a magnetic core in said coil, and
    means for mechanically coupling motion in said core to said tube.

4. In the array defined in claim 3,
    said core being of magneto-strictive metal.

5. In the array defined in claim 1,
    the transducers of said second group of transducers comprising stacked discs of piezoelectric material,
    relatively thin metal electrodes on opposed faces of said discs, alternate electrodes being connected together and to one terminal, and
    means for transmitting motion caused by mechanical deformation of said stacked discs to said tube.

6. In the array defined in claim 1,
    said elongated tube comprising a plurality of end-to-end sections of tubing,
    spaced headers interiorly of said tube at the end-to-end junctions of said sections, and
    means for attaching said sections to said headers to unify the assembly of said tube and transducers.

References Cited

UNITED STATES PATENTS 1,788,519　1/1931　Harrison ＿＿＿＿＿＿＿＿＿＿＿＿ 333—30

RICHARD A. FARLEY, Primary Examiner

BRIAN L. HIBANDO, Assistant Examiner